(12) United States Patent
Shestakov

(10) Patent No.: US 12,242,261 B2
(45) Date of Patent: Mar. 4, 2025

(54) SYSTEMS AND METHODS FOR EDITING ROUTES FOR ROBOTIC DEVICES

(71) Applicant: Brain Corporation, San Diego, CA (US)

(72) Inventor: Dmitriy Shestakov, San Diego, CA (US)

(73) Assignee: Brain Corporation, San Diego, CA (US)

( * ) Notice: Subject to any disclaimer, the term of this patent is extended or adjusted under 35 U.S.C. 154(b) by 277 days.

(21) Appl. No.: 17/865,912

(22) Filed: Jul. 15, 2022

(65) Prior Publication Data

US 2023/0017113 A1    Jan. 19, 2023

Related U.S. Application Data

(60) Provisional application No. 63/222,593, filed on Jul. 16, 2021.

(51) Int. Cl.
*G05D 1/00* (2024.01)
*G06F 3/04842* (2022.01)
*G06F 3/04845* (2022.01)
*G06T 11/20* (2006.01)

(52) U.S. Cl.
CPC ......... *G05D 1/0016* (2013.01); *G05D 1/0214* (2013.01); *G06F 3/04845* (2013.01); *G06T 11/203* (2013.01); *G06F 3/04842* (2013.01); *G06T 2200/24* (2013.01)

(58) Field of Classification Search
CPC .. G05D 1/0016; G05D 1/0214; G05D 1/0212; G06F 3/04845; G06F 3/04842; G06F 3/0481; G06F 3/0488; G06T 11/203; G06T 2200/24
See application file for complete search history.

(56) References Cited

PUBLICATIONS

Hwang, Jung-Hoon, Ronald C. Arkin, and Dong-Soo Kwon. "Mobile robots at your fingertip: Bezier curve on-line trajectory generation for supervisory control." Proceedings 2003 IEEE/RSJ International Conference on Intelligent Robots and Systems (IROS 2003)(Cat. No. 03CH37453). vol. 2. IEEE, 2003. (Year: 2003).*

\* cited by examiner

*Primary Examiner* — Alan D Hutchinson
(74) *Attorney, Agent, or Firm* — Pierson Ferdinand LLP; Sidharth Kapoor

(57) ABSTRACT

Systems and methods for editing routes for robotic devices are disclosed herein. According to at least one non-limiting exemplary embodiment, Bezier curves and controls are provided to enable a user to intuitively manipulate a robot route, including changing the shape of the route, deleting segments of the route, and/or adding new route segments.

17 Claims, 15 Drawing Sheets

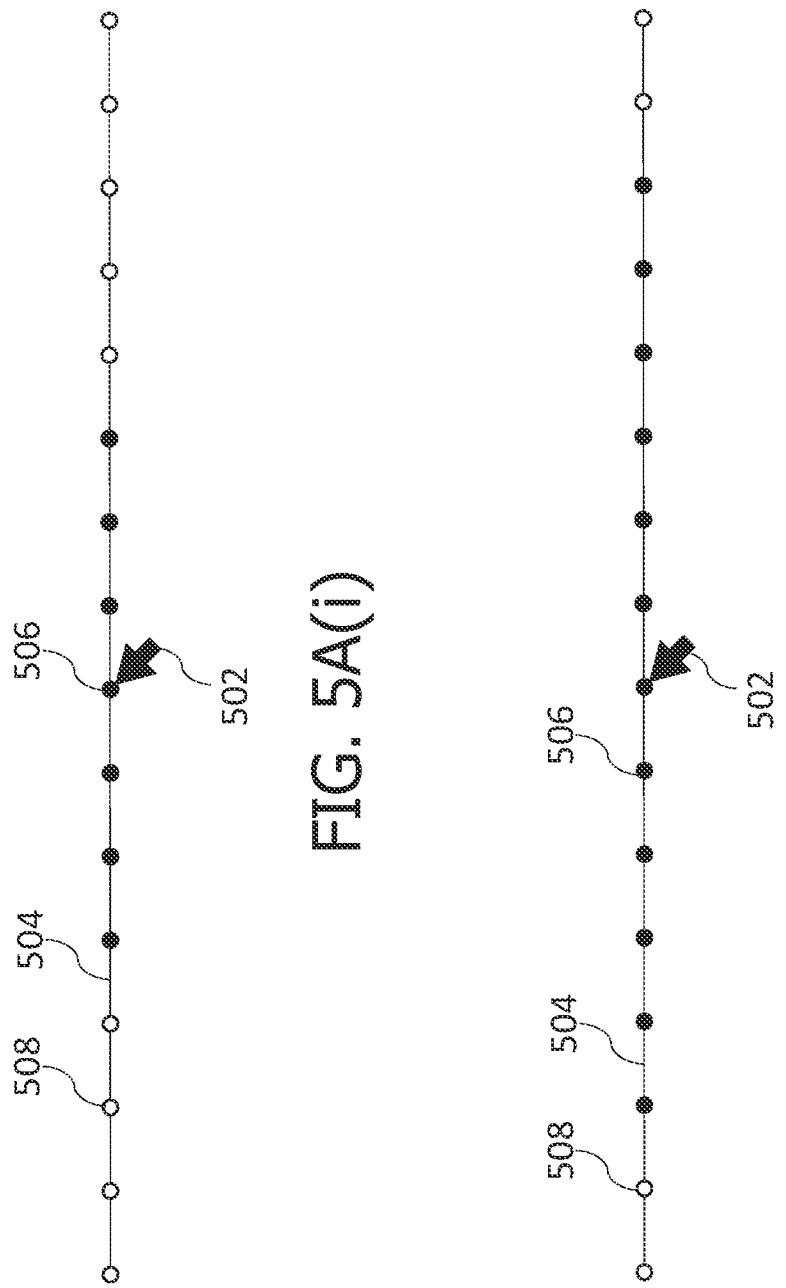

FIG. 5C(ii)

SYSTEMS AND METHODS FOR EDITING ROUTES FOR ROBOTIC DEVICES

CROSS-REFERENCE TO RELATED APPLICATION

Priority

This application claims the benefit of U.S. Provisional Patent Application Ser. No. 63/222,593 filed on Jul. 16, 2021 under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for editing routes for robotic devices.

SUMMARY

The foregoing needs are satisfied by the present disclosure, which provides for, inter alia, systems and methods editing routes for robotic devices.

Exemplary embodiments described herein have innovative features, no single one of which is indispensable or solely responsible for their desirable attributes. Without limiting the scope of the claims, some of the advantageous features will now be summarized. One skilled in the art would appreciate that, as used herein, the term robot may generally refer to an autonomous vehicle or object that travels a route, executes a task, or otherwise moves automatically upon executing or processing computer readable instructions.

According to at least one non-limiting exemplary embodiment, a robot is disclosed. The robot comprises: a user interface coupled thereto; and a non-transitory computer readable storage medium having a plurality of computer readable instructions stored thereon which, when executed by a controller of the robot, cause the robot to: receive, via the user interface, a user input to modify a route; update the route in accordance with the modifications using at least one Bezier curve; and execute the route, including the modification.

According to at least one non-limiting exemplary embodiment, the modifications include at least one of: deleting a segment of the route or changing a segment of the route to a new location.

According to at least one non-limiting exemplary embodiment, the robot further comprises computer readable instructions stored on the non-transitory computer readable memory which, when executed, cause the controller to: delete the segment of the route by receiving a selection, via the user interface, of a segment of the route, wherein the segment includes a beginning point and an end point; remove the segment of the route; and connect the beginning point and the end point using a Bezier curve.

According to at least one non-limiting exemplary embodiment, the Bezier curve is a cubic Bezier curve defined by four points, two of the points corresponding to the beginning and ending points, the remaining two points are determined based on (i) the spatial separation between the beginning and ending points, and (ii) the direction of the robot at the beginning and ending points.

According to at least one non-limiting exemplary embodiment, the segment of the route to be changed comprises a length defined via a user input from a first point along the route selected by the user input, and the segment is defined by a beginning point and an end point.

According to at least one non-limiting exemplary embodiment, the robot further comprises computer readable instructions stored on the non-transitory computer readable memory which, when executed, cause the controller to: receive, via the user interface, user input to change a location of the first point from one location to another; define a Bezier curve between (i) the first point and the beginning point, and (ii) the first point and the end point, the Bezier curve is defined based in part on the direction of the robot at the beginning, end, and first points.

According to at least one non-limiting exemplary embodiment, the robot further comprises computer readable instructions stored on the non-transitory computer readable memory which, when executed, cause the controller to: provide Bezier controls to the first point; and update the route in accordance with user input to the Bezier controls, the user input comprising moving the Bezier controls.

According to at least one non-limiting exemplary embodiment, the robot further comprises computer readable instructions stored on the non-transitory computer readable memory which, when executed, cause the controller to: receive, via the user interface, an undo operation which undoes a prior edit or deletion of the route; and receive, via the user interface, a redo operation which redoes an edit removed via the undo operation. According to at least one non-limiting exemplary embodiment, the route begins at a start point and ends at a final point; and the start and final points cannot be modified or deleted.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 5A(i-ii) illustrates the selection by a user of a portion of a route to be edited, according to an exemplary embodiment.

Figure 1A:
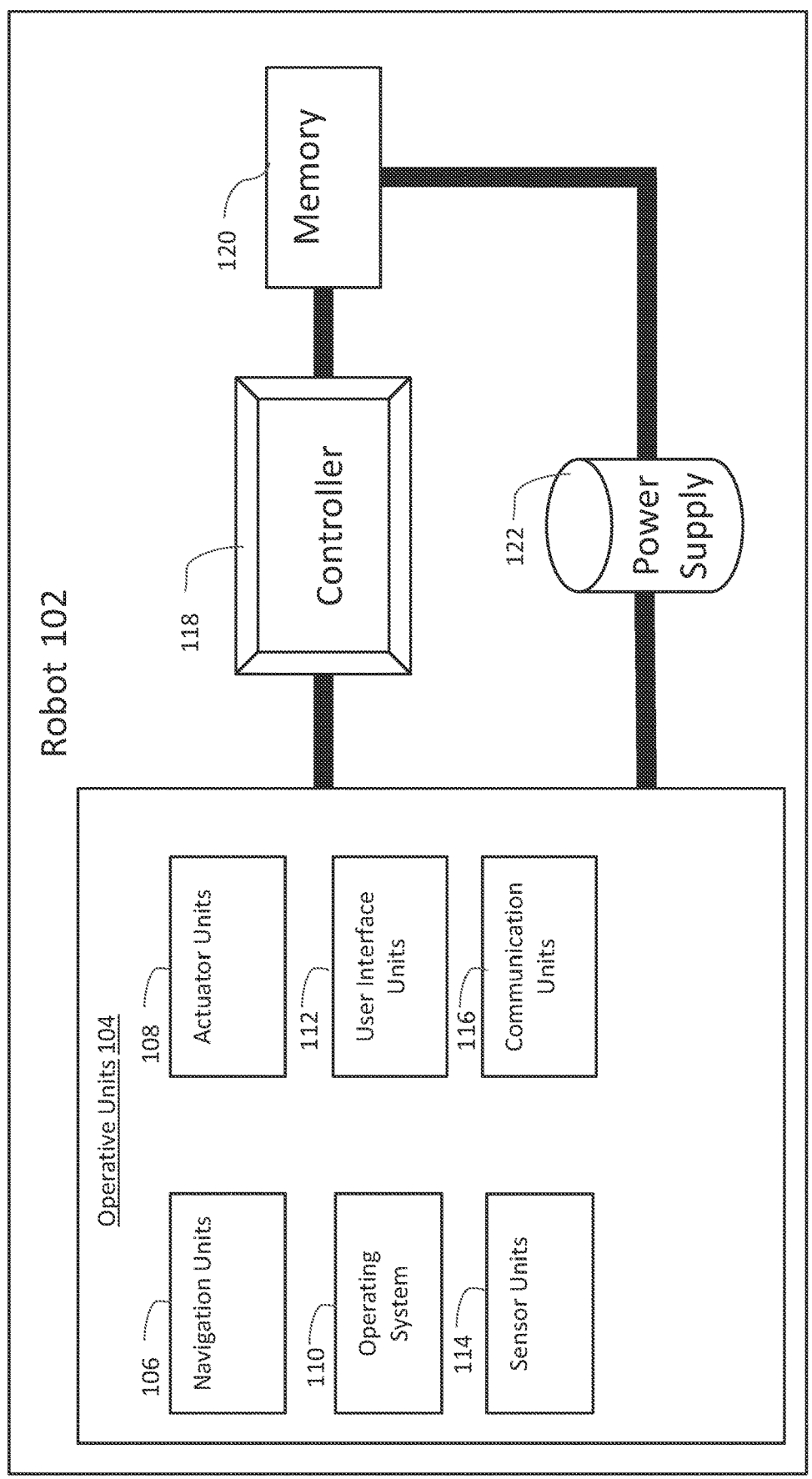
FIG. 1A is a functional block diagram of a robot in accordance with some embodiments of this disclosure.

All Figures disclosed herein are © Copyright 2022 Brain Corporation. All rights reserved.

DETAILED DESCRIPTION

Currently, robots operate by following a predetermined route or path. The route may be drawn on a map, demonstrated to the robot, defined by a series of waypoints, or downloaded from another robot, for example. Often the environments of these robots may change, thereby requiring a new route for the robot to navigate. In other instances, a route of a robot may be suboptimal and include unnecessary portions, wherein it may be desirable to change the route. One skilled in the art may envision a plurality of scenarios which may warrant a route of a robot to be changed. Accordingly, there is a need in the art for systems and methods to edit routes which provide intuitive controls to humans to allow for quick and seamless edits to a route of a robot.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for editing routes for robotic devices. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, mobile platforms, personal transportation devices (e.g., hover boards, SEGWAY® vehicles, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, network interfaces may include any signal, data, or software interface with a component, network, or process, including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, or 5G, including LTE/LTE-A/TD-LTE/TD-LTE, GSM, etc. variants thereof), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment, including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) enable robot routes to be customizable to their environment, (ii) adapt existing routes to better suit their environment, (iii) save time in retraining robotic paths by enabling edits to existing routes, and (iv) provide intuitive controls to enable humans to easily edit routes. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, processing device, microprocessor, and/or digital processor may include any type of digital processor such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Peripherals may include hardware accelerators configured to perform a specific function using hardware elements such as, without limitation, encryption/description hardware, algebraic processors (e.g., tensor processing units, quadradic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data, including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide computer-readable instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the computer-readable instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find its position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating and, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, etc.), antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments, user interface units 112 may be positioned on the body of robot 102. According to exemplary embodiments, user interface units 112 may be positioned away from the body of robot 102 but may be communicatively coupled to robot 102 (e.g., via communication units, including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3.5G, 3.75G, 3GPP/3GPP2/HSPA+), 4G (4GPP/4GPP2/LTE/LTE-TDD/LTE-FDD), 5G (5GPP/5GPP2), or 5G LTE (long-term evolution, and variants thereof, including LTE-A, LTE-U, LTE-A Pro, etc.), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer readable instructions stored on a non-transitory computer readable storage apparatus, such as memory 120, as would be appreciated by one skilled in the art.

Figure 1B:
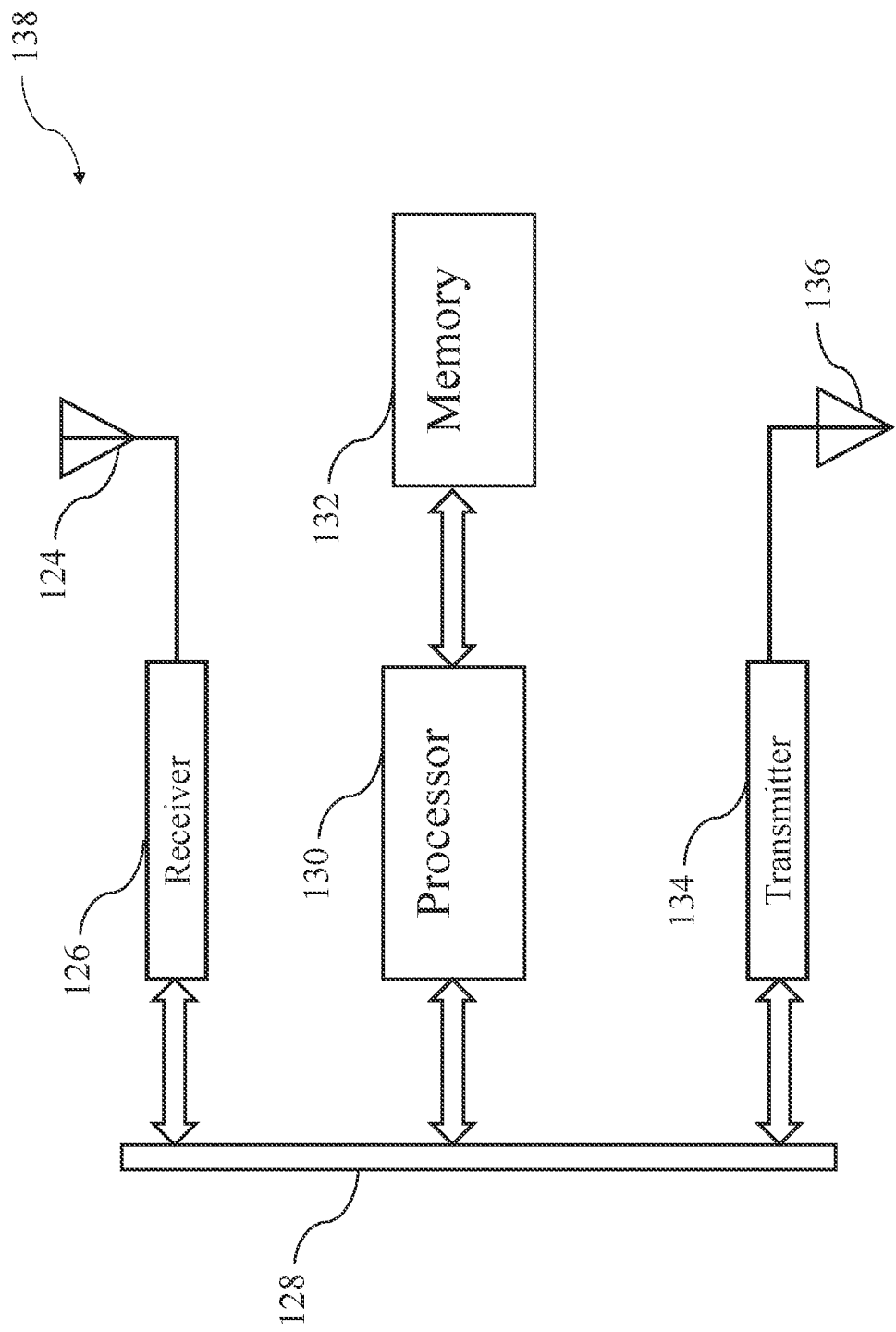
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132, which stores computer code or computer readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A, including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may also illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer readable instructions thereon.

One of ordinary skill in the art would appreciate that a controller 118 of a robot 102 may include one or more processing devices 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processing devices 138 thereof executing computer readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high-level tasks (e.g., planning a route to avoid obstacles) and processing devices 138 for performing low-level tasks (e.g., producing actuator signals in accordance with the route).

Figure 2:
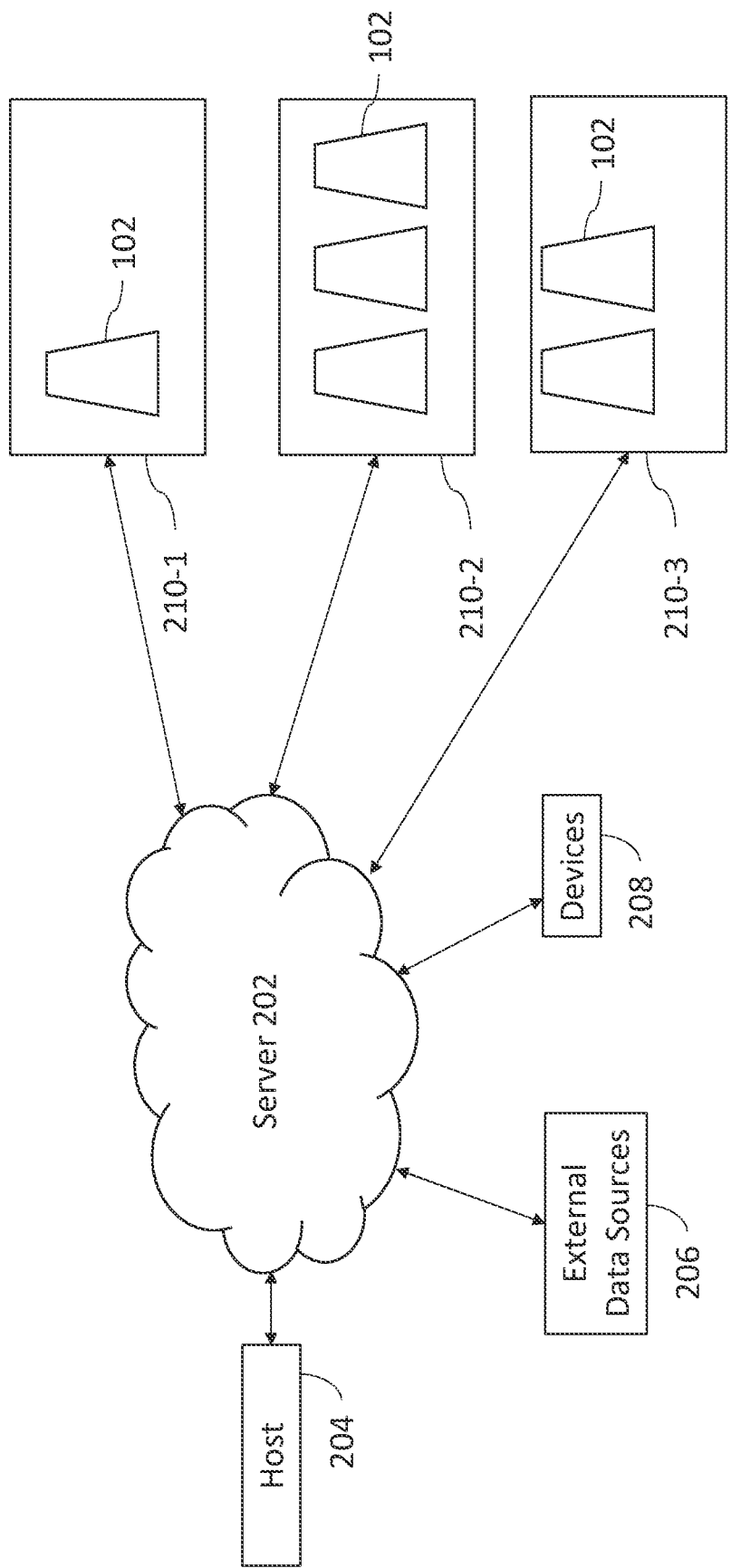
FIG. 2 is a functional block diagram of a server and robots coupled thereto, according to an exemplary embodiment.

FIG. 2 illustrates a server 202 and communicatively coupled components thereof in accordance with some exemplary embodiments of this disclosure. The server 202 may comprise one or more processing units depicted in FIG. 1B above, each processing unit comprising at least one processor 130 and memory 132 therein in addition to, without limitation, any other components illustrated in FIG. 1B. The processing units may be centralized at a location or distributed among a plurality of devices (e.g., a cloud server or dedicated server). Communication links between the server 202 and coupled devices may comprise wireless and/or wired communications, wherein the server 202 may further comprise one or more coupled antennae to effectuate the wireless communication. The server 202 may be coupled to a host 204, wherein the host 204 may correspond to a high-level entity (e.g., an admin) of the server 202. The host 204 may, for example, upload software and/or firmware updates for the server 202 and/or coupled devices 208 and 210, connect or disconnect devices 208 and 210 to the server 202, or otherwise control operations of the server 202. External data sources 206 may comprise any publicly available data sources (e.g., public databases such as weather data from the National Oceanic and Atmospheric Administration (NOAA), satellite topology data, public records, etc.) and/or any other databases (e.g., private databases with paid or restricted access) that the server 202 may access data therefrom. Devices 208 may comprise any device configured to perform a task at an edge of the server 202. These devices may include, without limitation, internet of things (IoT) devices (e.g., stationary CCTV cameras, smart locks, smart thermostats, etc.), external processors (e.g., external CPUs or GPUs), and/or external memories configured to receive and execute a sequence of computer readable instructions, which may be provided at least in part by the server 202, and/or store large amounts of data.

Lastly, the server 202 may be coupled to a plurality of robot networks 210, each robot network 210 comprising a local network of at least one robot 102. Each separate network 210 may comprise one or more robots 102 operating within separate environments from each other. An environment may comprise, for example, a section of a building (e.g., a floor or room) or any space in which the robots 102 operate. Each robot network 210 may comprise a different number of robots 102 and/or may comprise different types of robot 102. For example, network 210-2 may comprise a scrubber robot 102, vacuum robot 102, and a gripper arm robot 102, whereas network 210-1 may only comprise a robotic wheelchair, wherein network 210-2 may operate within a retail store while network 210-1 may operate in a home of an owner of the robotic wheelchair or a hospital. Each robot network 210 may communicate data, including, but not limited to, sensor data (e.g., RGB images captured, LiDAR scan points, network signal strength data from sensors 202, etc.), IMU data, navigation and route data (e.g., which routes were navigated), localization data of objects within each respective environment, and metadata associated with the sensor, IMU, navigation, and localization data. Network 210-3 may comprise a plurality of robots 102 operating in similar environments linked to a central control point such as security robots operating in one or more environments and linked to a central command center. Each robot 102 within each network 210 may receive communication from the server 202, including, but not limited to, a command to navigate to a specified area, a command to perform a specified task, a request to collect a specified set of data, a sequence of computer readable instructions to be executed on respective controllers 118 of the robots 102, software updates, and/or firmware updates. Server 202 may also facilitate communication among robots 102 within or among one or more networks 210. One skilled in the art may appreciate that a server 202 may be further coupled to additional relays and/or routers to effectuate communication between the host 204, external data sources 206, edge devices 208, and robot networks 210 which have been omitted for clarity. It is further appreciated that a server 202 may not exist as a single hardware entity; rather, it may be illustrative of a distributed network of non-transitory memories and processors.

According to at least one non-limiting exemplary embodiment, each robot network 210 may comprise additional processing units as depicted in FIG. 1B above and act as a relay between individual robots 102 within each robot network 210 and the server 202. For example, each robot network 210 may represent a plurality of robots 102 coupled to a single Wi-Fi signal, wherein the robot network 210 may comprise in part a router or relay configurable to communicate data to and from the individual robots 102 and server 202. That is, each individual robot 102 is not limited to being directly coupled to the server 202 and devices 206, 208.

One skilled in the art may appreciate that any determination or calculation described herein may comprise one or more processors of the server 202, edge devices 208, and/or robots 102 of networks 210 performing the determination or calculation by executing computer readable instructions. The instructions may be executed by a processor of the server 202 and/or may be communicated to robot networks 210 and/or edge devices 208 for execution on their respective controllers/processors in part or in entirety (e.g., a robot 102 may calculate a coverage map using measurements 308 collected by itself or another robot 102). Advantageously, use of a centralized server 202 may enhance a speed at which parameters may be measured, analyzed, and/or calculated by executing the calculations (i.e., computer readable instructions) on a distributed network of processors on robots 102 and devices 208. Use of a distributed network of controllers 118 of robots 102 may further enhance functionality of the robots 102 as the robots 102 may execute instructions on their respective controllers 118 during times when the robots 102 are not in use by operators of the robots 102.

It is appreciated that any edits to a route performed using user interface 112 of a robot 102 as described herein may also or alternatively be performed on a device 208 coupled to the server 202. To perform the edits remotely, computer readable maps comprising routes to be edited may be communicated to the server 202 from the robot 102. A device 208, such as a personal computer, coupled thereto may retrieve the computer readable maps and enable a user to edit the routes in accordance with the methods described herein. Once editing is complete (e.g., upon saving the changes), the device 208 may communicate the updated map and route data to the server 202 which in turn communicates the map and route data to the robot 102, wherein the robot 102 overrides the previous map and route data with the new data from the server 202. In embodiments, route edits executed on device 208 may be communicated to more than one robot 102 such that route data may be edited on a number of robots 102 simultaneously.

Figure 3:
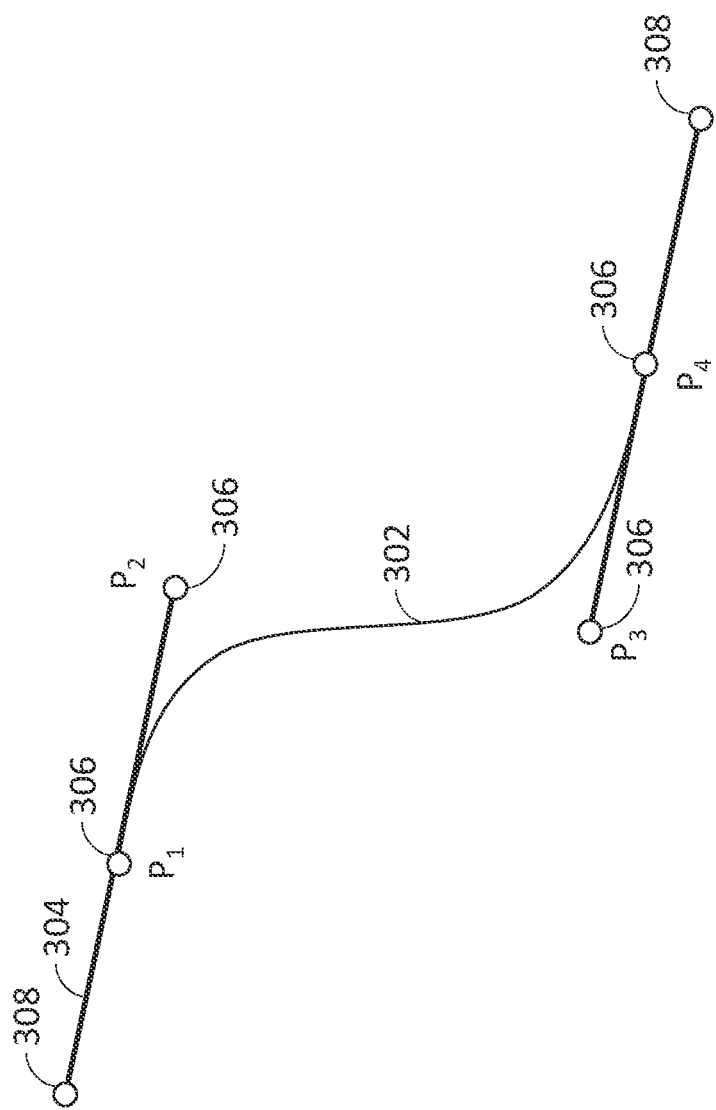
FIG. 3 illustrates a Bezier curve and Bezier controls thereof, in accordance with some embodiments of this disclosure.

FIG. 3 illustrates a two-dimensional Bezier curve 302 with Bezier controls, according to an exemplary embodiment. A Bezier curve 302 is a curve defined mathematically by the (x, y) location of various control points 306. In the illustrated embodiment, the Bezier curve 302 is a cubic Bezier curve defined by four control points $P_1$-$P_4$. A cubic Bezier curve is defined by equation 1 below:

$$B(t)=(1-t)^3 P_1+3(1-t)^2 t P_2+3(1-t)t^2 P_3+t^3 P_4, 0 \le t \le 1 \quad \text{(Eqn. 1)}$$

wherein $P_n$ are (x, y) location matrices and parameter t ranges from [0, 1], n being an integer ranging from 1-4. One skilled in the art may appreciate that higher order or lower order Bezier curves may be utilized. However, cubic Bezier curves are preferred and are widely adopted in other arts, such as computer graphics, because the controls offer human-intuitive manipulation of the curve 302.

Bezier controls, as used herein, are defined by four control points 306 $P_1$-$P_4$ which may be moved to manipulate the shape, size and location of the curve 302. Points $P_1$ and $P_4$ define the start and end points of the curve 302, and points 306 $P_2$ and $P_3$ further define the shape of the curve 302 in accordance with equation 1. Points 306 $P_2$ and $P_3$ are connected via an axis 304 to points $P_1$ and $P_4$, respectively, wherein points $P_1$ and $P_4$ are located at the center of their respective axes 304. Points 308 are equal distance from the center points 306 $P_1$ and $P_4$. Points 308 serve as additional control points which serve a similar, mirrored function as points 306 $P_2$ and $P_3$, wherein manipulating the points 308 causes a mirrored manipulation of points 306 $P_2$ and $P_3$ about the center points 306 $P_1$ and $P_4$. In some instances, points 308 may be hidden from view in Bezier controls for graphical clarity when displayed on a user interface 112 of a robot 102, as described in more detail below.

Figure 4:
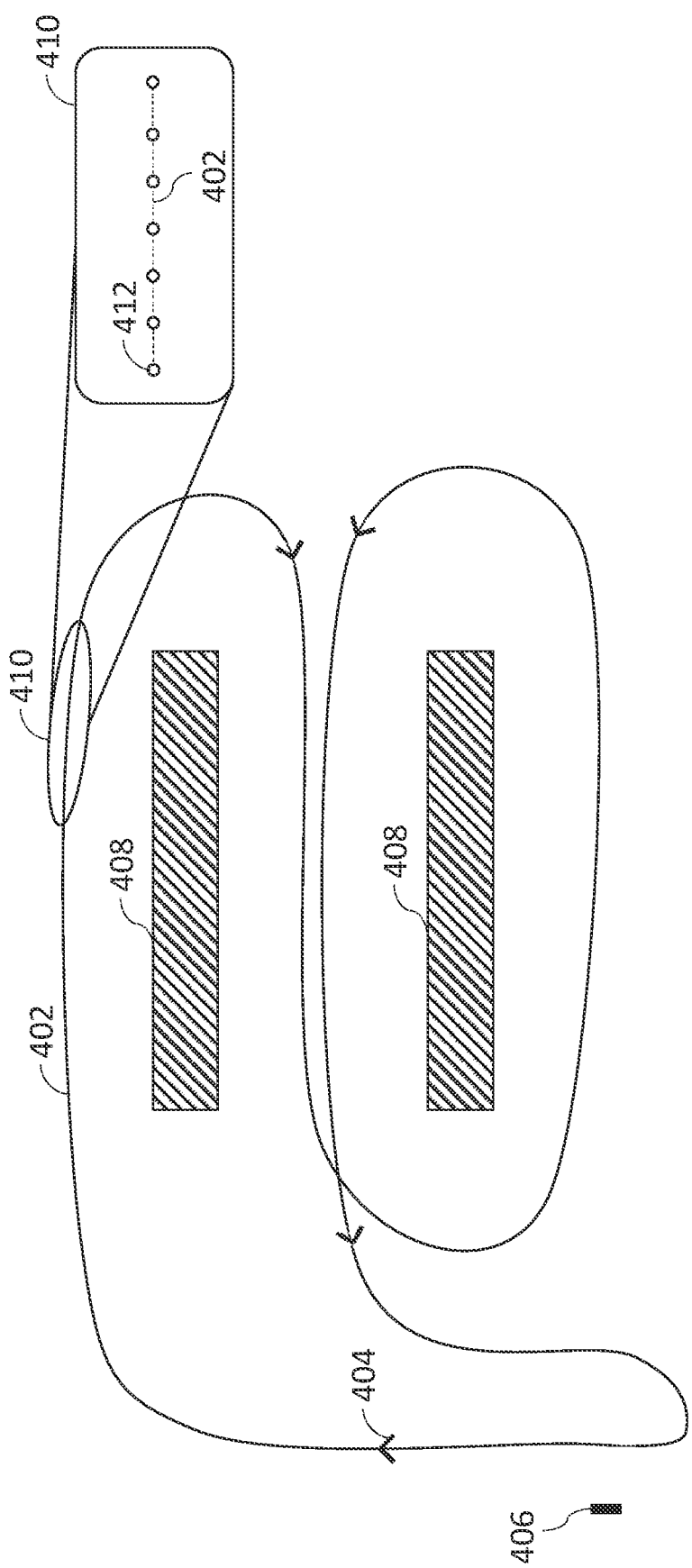
FIG. 4 illustrates a route on a computer readable map, in accordance with some embodiments of this disclosure.

FIG. 4 illustrates a computer readable map of a route 402 navigated by a robot 102, according to an exemplary embodiment. The route 402 may begin proximate to a landmark 406. The landmark 406 may comprise a notable feature within the environment, such as a uniquely shaped object, a pattern (e.g., on the floor, ceiling or walls), a computer readable code (e.g., a quick-response or barcode), or another static feature detectable by the robot 102. By detecting the landmark 406, the controller 118 of the robot 102 is provided with an initial location of the robot 102.

The route 402 may comprise a plurality of discrete route points 412, shown in an expanded view 410 of a portion of the route 402. These route points 412 may define states of the robot 102 as the robot 102 moves along the route 402. More specifically, for robots 102 which operate in substantially two dimensions (e.g., robots 102 operating on flat floors) each route point 412 may define an (x, y, θ) position of the robot 102 as well as hardware states. As used herein, θ indicates the direction the robot 102 is traveling at the point 412. Hardware states, as used herein, refer to the actuation of specific hardware on robot 102. For example, if robot 102 is a floor cleaning robot comprising a vacuum, the route points 412 may further include hardware state values which define the vacuum being on or off using a binary parameter. In some instances, the hardware states may include numerous states and/or the parameters may comprise analog values or signals. By moving from $(x_n, y_n, \theta_n)$ to $(x_{n+1}, y_{n+1}, \theta_{n+1})$, n being an integer, the robot 102 navigates along the route 402. The spacing between points 412 may be separated by equal time to travel from one point to another or separated by equal distance.

The following figures illustrate various edits to route 402 and other routes which may be performed. Any of the edits shown herein may be performed in any order as deemed necessary by a user. Further, any decision, process, route edits, or method discussed herein as being executed on a controller 118 and/or user interface units 112 may alternatively be executed via a server 202, processor thereof, and device 208 coupled thereto comprising a user interface. First, in FIG. 5A(i-ii) a user selects a portion of a route 504 to edit, according to an exemplary embodiment. The route 504 comprises route points 506, 508 corresponding to the route points 412 shown in FIG. 4 above, wherein route points 506 (black) represent the currently selected route points to be edited and points 508 (white) are unselected and remain unedited. Pointer 502 represents a mouse pointer or touch screen input used to receive user input. The user may select a first point 506 to be edited, wherein the controller 118 of the robot 102 may select a predetermined number of additional points 506. In the illustrated embodiment of FIG. 5A(i), 3 additional route points 506 are selected on both sides of the selected point 506, but fewer or more route points 506 may be selected in other instances.

According to at least one non-limiting exemplary embodiment, the user may select points 506 via selecting two points along the route 504, wherein the two points selected would define the boundary of any edits performed. That is, only route points in between the selected two points can be manipulated.

FIG. 5A(ii) illustrates that the user has selected additional route points 506 to edit, according to the exemplary embodiment. The user interface units 112 may enable the user to select additional route points via a button, touch screen input, or keyboard input. For example, using a keyboard, the up arrow may select more points 506 and the down arrow may select fewer points 506. Alternatively, the user may select fewer points from the default number of points to facilitate small edits.

Figure 5B:
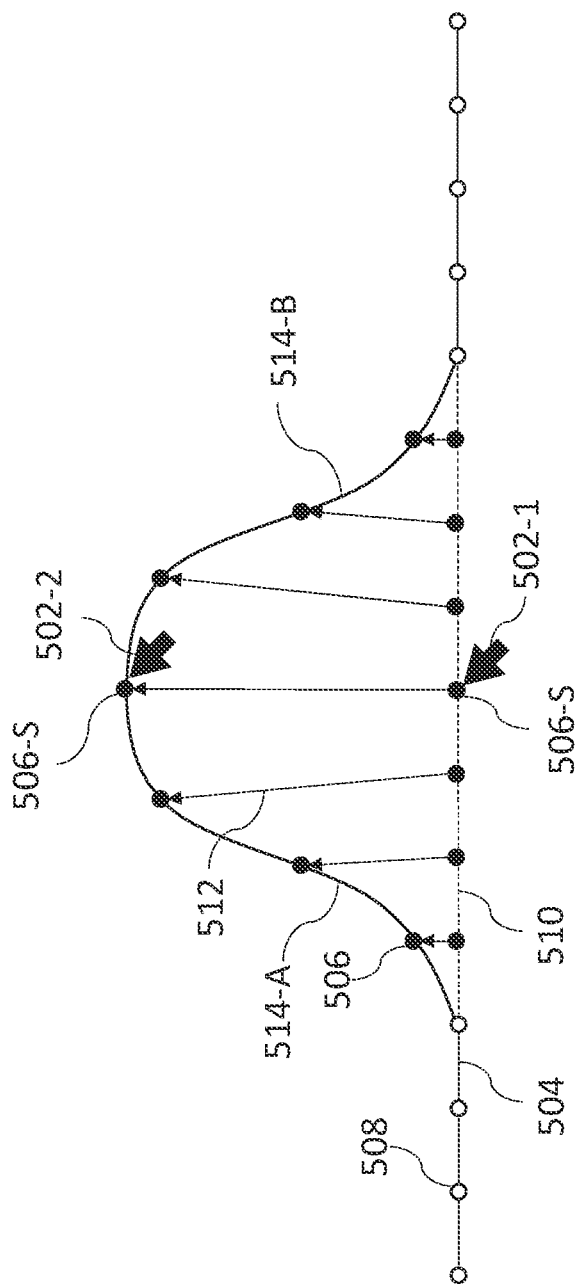
FIG. 5B illustrates an edit to a selected portion of a route by a user, according to an exemplary embodiment.

Once the user has selected points 506 to edit, the user may then manipulate the points 506 as shown next in FIG. 5B which depicts an edit to the segment of the route, according to an exemplary embodiment. The user, by moving pointer 502 from position 502-1 to position 502-2, may manipulate the point 506-S selected by pointer 502-1. The user may click and drag, click twice, drag upon a touch screen, etc. to manipulate the location of the selected point 506-S. Once the selected point 506-S is moved to the position of cursor 502-2, the controller 118 may connect the selected point 506-S to the nearest non-edited points 508 using a Bezier curve 514. The initial position of control points 306 which define the Bezier curve 514 is described in more detail in FIG. 6B below. In short, the angular direction θ of the unselected points 508 is maintained which defines the Bezier points for the unselected point 508 at the boundary of the edited selected points 506. Once the Bezier curves 514 are defined which connect the selected point 506-S to its two nearest neighboring non-edited points 508, the remaining selected points 506 are moved onto the Bezier curve 514, as shown by arrows 512. The selected points 506 may be placed at equal distances from each other and equal distances from the selected point 506-S. The pose parameters, i.e., x, y, θ positions of the manipulated selected route points 506 may be accordingly updated to account for the new shape of the route. In some instances, points 506 are deleted or added upon a segment of the route 504 being changed in accordance with any deleted length or added length of the route 504.

Figure 5C:
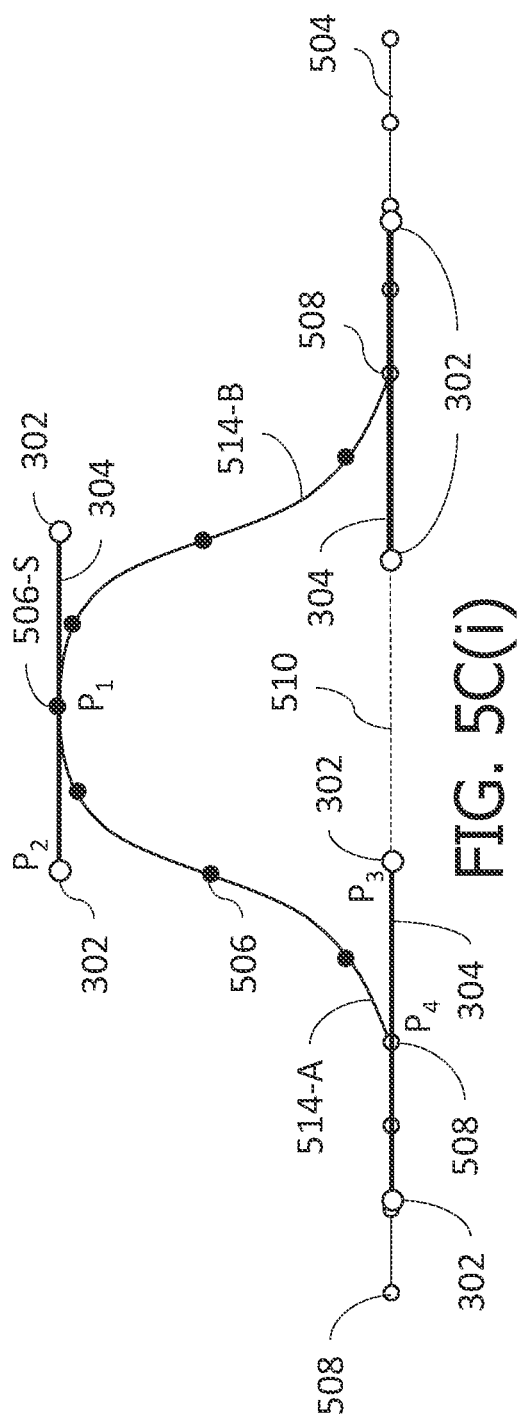
FIG. 5C(i-ii) illustrates edits to a selected portion of a route using a Bezier curve and Bezier controls, according to an exemplary embodiment.
Figure 5C:
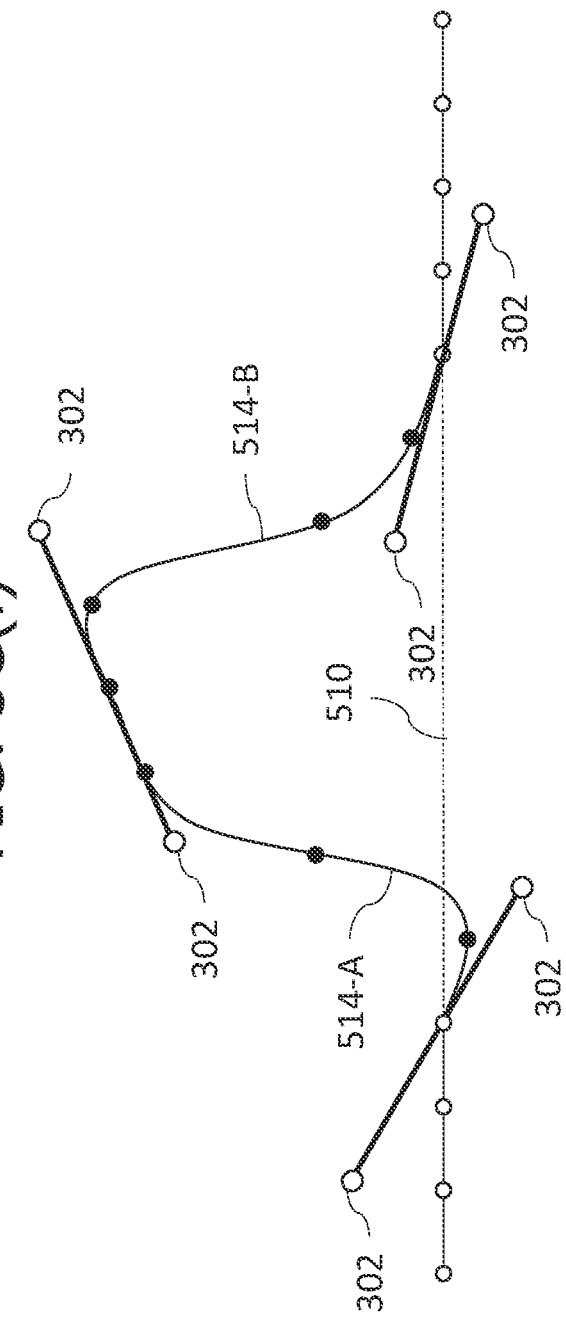

Next, in FIG. 5C(i) Bezier controls are provided, according to an exemplary embodiment. The Bezier controls include an axis 304 centered about a respective route point, wherein the axis 304 includes two control points 302 at equidistant opposing ends. Bezier controls are provided to the selected point 506-S as well as the two nearest neighboring non-selected and non-edited points 508. These three points form the end-points for the two Bezier curves 514-A, 514-B. The initial placement of the control points 302 which do not lie on the curve 514-A, 514-B may be based on the direction of the robot 102, as will be described in more detail in FIG. 6B below. Points $P_1$-$P_4$ are labeled for the left side Bezier curve 514-A for reference to FIG. 3 above.

Once the Bezier controls are provided, the user may select a control point 302 to manipulate the curve, as shown next in FIG. 5C(ii) which depicts an exemplary edit using the Bezier curves to the route 504, according to the exemplary embodiment. As shown, the user may manipulate (i.e., move) the Bezier control points 302 to change the shape of the Bezier curves 514, thereby changing the shape of the route 504. The edits performed in FIG. 5C(ii) are not intended to be limiting, but rather illustrate an exemplary manipulation of the Bezier curves 514 using Bezier controls, wherein one skilled in the art may appreciate a near infinite number of possible edits to the route 504 using these Bezier controls.

Although not depicted, in some instances, the user may desire to manipulate other points which do not currently have defined Bezier controls. Accordingly, the user may select, via cursor 502, a new point 506 or 508 to edit (e.g., via clicking or tapping the point). Once the user selects the new point to be edited, the new point will be assigned Bezier controls in accordance with the other points 506, 508 of the route 504. For instance, in FIG. 5C(ii), if the user after performing the illustrated edits selects a new point to edit, such as either of the two points on curve 514-A, the selected new point will be provided Bezier controls defined by (i) the leftmost Bezier controls for the first non-selected point 506 towards the left, and (ii) the Bezier controls for the point 506-S provided already. The Bezier controls for the points 506-S and 508 shown preferably do not disappear once the new point is selected, thereby providing four (4) Bezier controls to manipulate the route.

According to at least one non-limiting exemplary embodiment, the two Bezier controls 302 provided to the left and right non-selected points 508 are hidden from a user, thereby making them unchangeable. This is preferred for non-holonomic robots 102 which cannot turn in place as changing the θ state values for these points 508 may cause jerking, sudden turning movements which is less preferred and may be unnavigable. By constraining the Bezier controls for the end points of the Bezier curves 514-A, 514-B from being manipulated by a user, possible bad edits which cause undesired robot performance can be avoided. Robots 102 which can turn in place may not have the same constraints in their turning performance.

Advantageously, the use of Bezier controls enables a human operator to produce smooth paths easily and intuitively for the robot 102 to follow. The Bezier controls allow for a near infinite number of possible edits to the route to account for various environments robots 102 may operate in and changes to those environments. These and other edits described in this disclosure provide comprehensive and intuitive route editing.

Figure 6A:
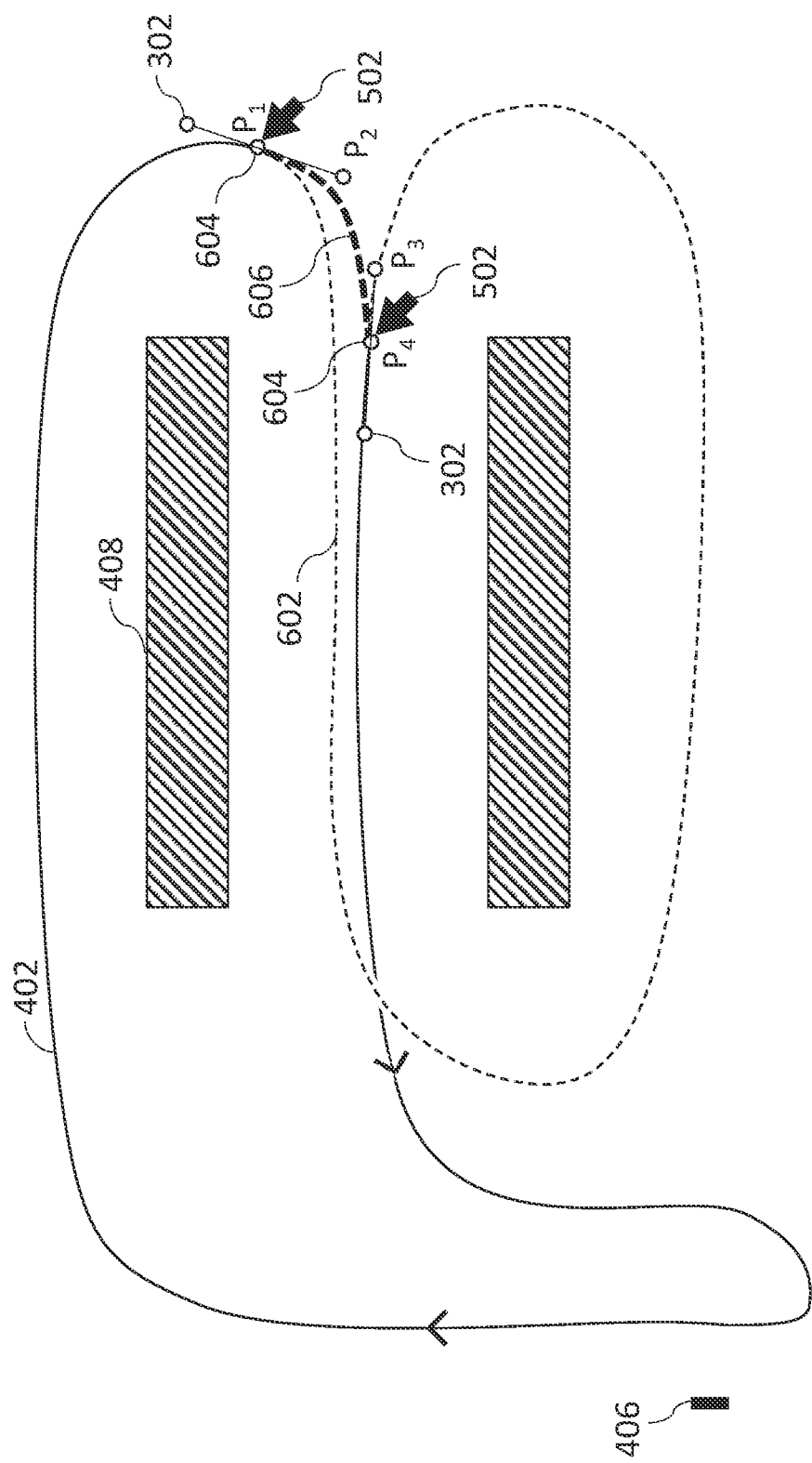
FIG. 6A illustrates deletion of a portion of a route, according to an exemplary embodiment.

FIG. 6A returns to the exemplary computer readable map shown previously in FIG. 4 wherein the user desires to remove a portion 602 of the route 402, according to an exemplary embodiment. To delete the portion 602, the user may first select two route points 604. The two selected route points 604 define a beginning and end of portion 602 and may be selected in any order. One consideration, however, is that the portion between the two selected points 604 may not include the start of route 402 or, for cyclic routes, end of the route as well. Changing the start and end of the route 402 may cause the robot 102 to be unable to discern its initial position upon sensing landmark 406.

The two selected points 604 may define two points of a Bezier curve. The orientation of control points 302 $P_2$ and $P_3$ may then be calculated based on the initial orientation of the robot 102 at both the start and end points 604. The distance of the control points 302 from the center of the axis 304 (i.e., from the selected points 604) is a predetermined value (e.g., 1 m). Using these points, the Bezier curve 606 which connects the two selected points 604 together may be defined.

In some embodiments, the user interface units 112 may continue to display the deleted segment 602 as reference to the human editor. Further, the controller 118 of the robot 102 may track any changes to enable an undo or redo function if the human editor later determines that their edits were undesirable.

It is appreciated that the Bezier controls 302 shown in FIG. 6A may not be available to a user to manipulate in every embodiment. For example, for non-holonomic robots 102, these points 604 are required to maintain their θ heading. For holonomic robots 102, the constraint of the heading angle is not a requirement as these robots 102 are capable of turning substantially in place.

Figure 6B:
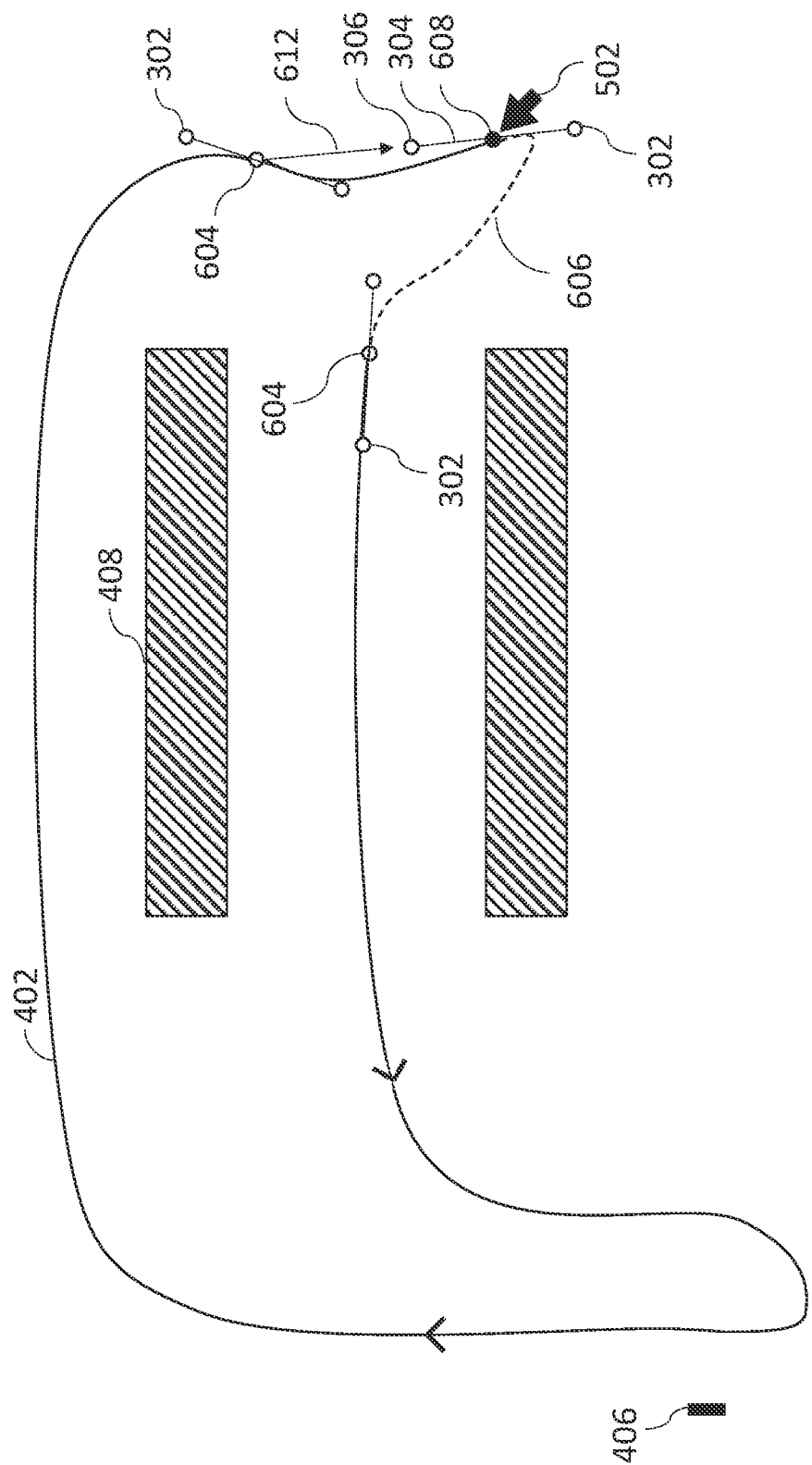
FIG. 6B illustrates addition of a new portion of a route following a deletion of a segment, according to an exemplary embodiment.

In some instances, the user may, after deleting the segment 602, desire to design or define a new path for the robot 102 to follow, as illustrated next in FIG. 6B, according to an exemplary embodiment. The user may, after defining the beginning and end points 604 of the portion 602 to be deleted, click, touch, or select a new location for a new route point 608, as shown by cursor 502. Once the new point 608 is determined, a Bezier curve may be defined which connects the two points 604, 608 together and Bezier controls may be provided to the new point 608. The orientation of the axis 304 of the Bezier controls provided to the new route point 608 are based on the relative location of the new point 608 with respect to the beginning point 604, as shown by vector 612 being aligned to the axis 304. The distance of control points 302, 306 from the center of the axis 304 (i.e., distance from point 608) is proportional to the distance between the points 608 and 604. In some embodiments, the distance is a predetermined value. Additionally, the controller 118 may place route points between the beginning point 604 and the new point 608 at equal distances from each other or at pre-defined intervals.

Controller 118 may continuously calculate a segment 606 which connects the most recent new point 606 to the end point 604 of the deleted segment 602. By calculating the segment 606, the controller 118 enables the human user, at any time, to auto-complete the route via automatically connecting the newest point 606 to the remaining portion of the route 402. This segment 606 may be always displayed on the user interface units 112 to allow the human editor to view the auto-complete solution. The user may continue to add new points 608 to the route 402, wherein each new point 608 will be connected via a Bezier curve to the most recent, previously added point 608 as well as the end point 604 of the deleted segment 602. Further, at any point or time, the user may manipulate the Bezier control points 302 to shape the route 402 in a desirable manner.

Advantageously, the systems and methods for route editing disclosed herein enable intuitive building of new route portions without the need to retrain the route. Further, the route edits disclosed herein may be performed external to the robot 102 at a remote location, as described in FIG. 2 above, and could be performed while the robot 102 performs other tasks. The edits available to the user can be scaled to large edits, effecting a large route segment, or small edits, effecting a small route segment, wherein a user may define the magnitude of the edits they would like to perform. The edits enable the user to further delete, add, and change existing routes, or portions thereof. Further, the extensive use of Bezier curves generates smooth and intuitively manipulatable routes.

Figure 7:
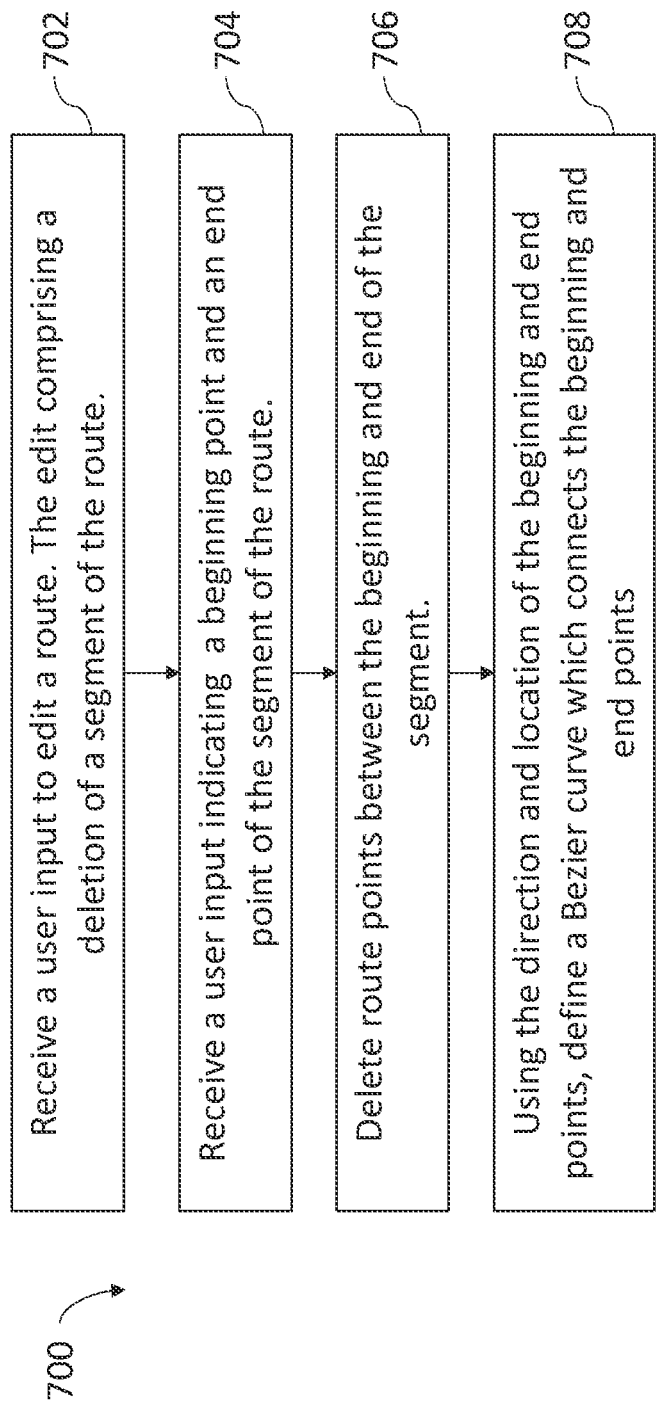
FIG. 7 is a process flow diagram illustrating a method for a controller of a robot to delete a segment of a route, according to an exemplary embodiment.

FIG. 7 is a process flow diagram illustrating a method 700 for a controller 118 to edit a route by deleting a segment thereof, according to an exemplary embodiment. Steps of method 700 may be effectuated via the controller 118 executing computer readable instructions from memory 120.

According to at least one non-limiting exemplary embodiment, method 700 may be executed on a device 208 external to the robot 102, wherein the edits to the route may be communicated to the robot afterwards. A more detailed explanation of how to effectuate remote edits is shown and described in FIG. 11 below.

Block 702 includes the controller 118 receiving a user input to edit a route, the edit comprising a deletion of a segment of the route. User interface units 112 may enable the user to select a route to be edited and provide the user with options to edit the route, including deleting the segment.

Block 704 includes the controller 118 receiving a user input indicating a beginning point and an end point of the segment of the route to be deleted. To illustrate further, points 604 in FIG. 6A above show these beginning and ending points in an exemplary embodiment. The user input may include the user selecting, clicking, tapping, etc. on a location along the route, wherein the controller 118 selects the nearest route point. The user may then select a second point along the route in a similar manner, wherein these two points define the beginning and ending points of the segment to be deleted.

Block 706 includes the controller 118 deleting route points between the beginning and end of the segment. "Deleting," as used in the context of block 706, does not include complete removal of the deleted segment from memory, but rather the segment is removed from the user interface display or otherwise indicated as the deleted segment. A memory buffer may still store the data of the deleted segment to enable the user, if desired, to undo or modify the deletion.

Block 708 includes the controller 118 defining a Bezier curve that connects the beginning and end points selected in block 704. The Bezier curve is defined by four points: the two points selected in block 704 and the other two control points ($P_2$ and $P_3$) are placed at a predetermined distance from the first two points along an axis 304. The axis 304 is oriented along the direction of the robot 102 at the beginning or end points (i.e., based on the θ value).

For non-holonomic robots 102, the user interface does not provide any user-manipulatable controls to the Bezier curve defined in block 708 in order to preserve the heading angle θ. The Bezier curve is still defined by the Bezier control points 306, however the user is simply unable to manipulate them and they may be hidden from the user interface view entirely. Preserving the heading angle θ ensures smooth, jerk-free motion of the edited route. If a user desires to manipulate the size or shape of the solution determined in block 708, the user may add a new route point and manipulate that point via Bezier controls applied thereto (e.g., see FIG. 6B or FIG. 9).

For holonomic robots 102 which can turn in place, the user interface may, in some embodiments, provide Bezier controls to the beginning and end points of the deleted segment. Holonomic robots 102, due to their ability to turn in place, may permit modification of their heading angle in all 360° with zero translational movement.

Following method 700, the user interface may be further configured to add new segments of the route or modify existing segments of the route following methods 800, 900 described below, respectively. In some instances, the user may begin their edits with method 800 to change existing segments of a route, then execute methods 700 and 900 to delete and add new route segments. Thus, it is appreciated that the order in which methods 700, 800, 900 are presented are not intended to limit the order in which they may be executed based on the preference of the user to edit routes in a manner the user prefers.

Figure 8:
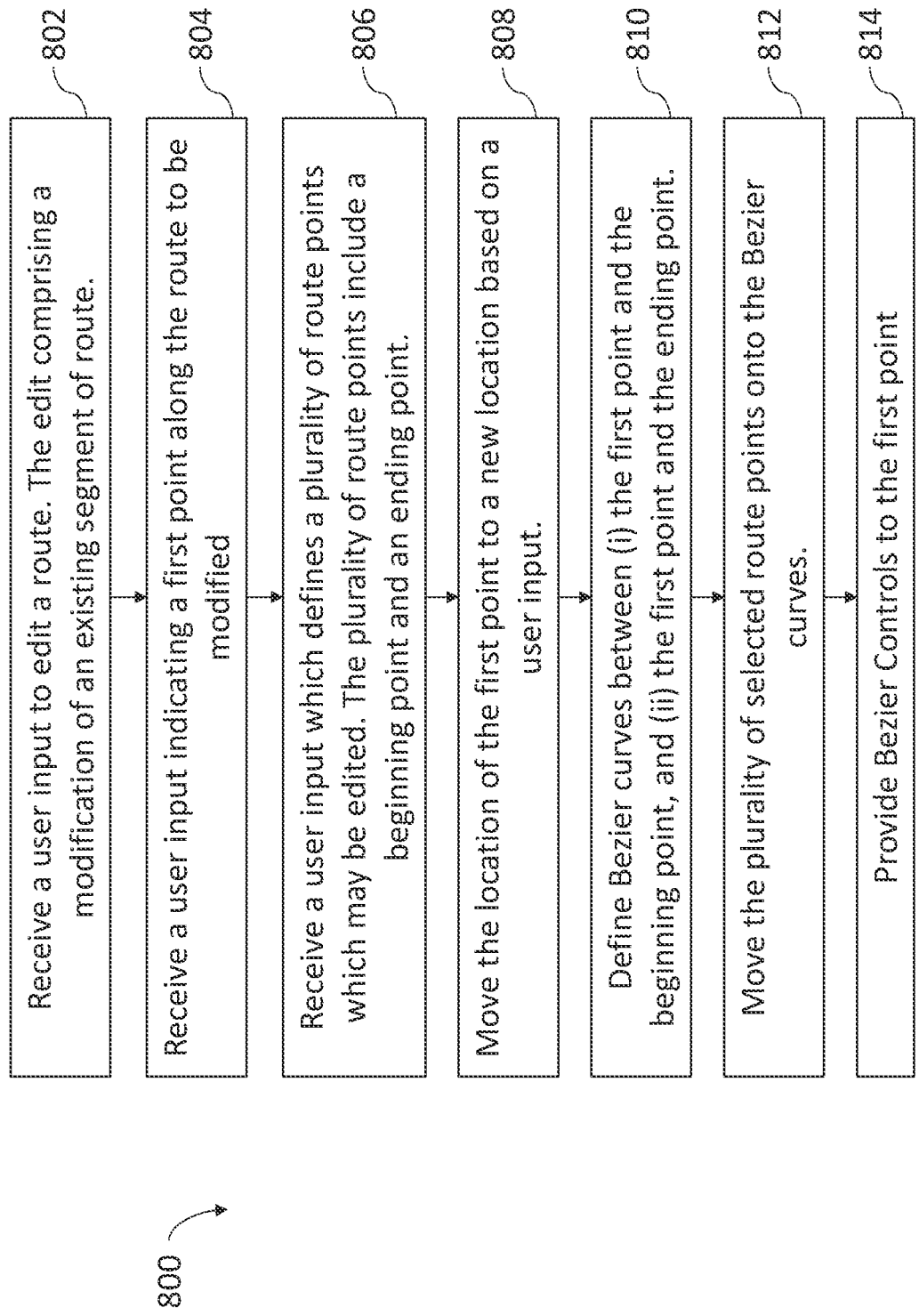
FIG. 8 is a process flow diagram illustrating a method for a controller of a robot to edit a segment of a route, according to an exemplary embodiment.

FIG. 8 is a process flow diagram illustrating a method 800 for a controller 118 of a robot 102 to edit an existing segment or portion of a route, according to an exemplary embodiment. Steps of method 800 may be effectuated via the controller 118 executing computer readable instructions from memory 120. Similar to method 700, method 800 may also be executed on a device 208 external to the robot 102, wherein edits to the routes may be communicated to the robot 102 once the edits are complete.

Block 802 includes the controller 118 receiving a user input to edit a route. The user may select an option on the user interface units 112 which enables modification of an existing segment of the route. In some embodiments, simply selecting a first point, as described in block 804 next, may serve as sufficient input to the user interface 112 to indicate that a change to a segment of route is desired.

Block 804 includes the controller 118 receiving a user input indicating a first point along the route to be modified. The user input may comprise the user clicking, tapping, or otherwise selecting a point along the route to be modified. In some instances, the controller 118 may select a route point 412 closest to the click/tap location selected by the user to account for human error (e.g., the human clicking slightly off the route).

Block 806 includes the controller 118 receiving user input which defines a plurality of route points 506 to be edited. The points to be edited are sequential points 412 along the route. In some embodiments, the user clicking/selecting a location along the route in block 804 may cause the controller 118 to select a predetermined number of route points 412 on either side of the selected point along the route. For example, clicking on a point on the route may, by default, select 11 route points 412, with 5 points 412 on either side of the selected point. Other user inputs may further cause the controller 118 to select more or fewer points 412 along the route to be edited, as shown in FIG. 5A(i-ii) for example, using a keyboard input (e.g., up and down arrows), touch screen input (e.g., tapping on a certain location on the screen), or similar inputs. The selected segment (i.e., sequence of route points 412) is bounded by a beginning and end point which are not selected for editing and are the nearest neighboring unselected points to the first point along the route, as shown in FIG. 5B for example by points 504 nearest Bezier curves 514. Alternatively, two sequential clicks on the route by the user may define beginning and end points of the route segment to be edited, wherein all intervening points are included in the route segment. In some embodiments, once the beginning and ending points of the segment are selected, the user may drag the beginning/ending point along the route to shorten or lengthen the selected segment. Selecting a segment via selecting the beginning and ending of the segment may be advantageous for routes which include a lot of overlap, wherein it may be difficult to otherwise select a particular segment which overlaps with another via clicking directly on it.

Block 808 includes the controller 118 moving the location of the first point, selected in block 804, to a new location in accordance with user input. The user may click the new desired location for the first point or drag (e.g., click and drag or drag over a touch screen) the first point from its initial location to a desired new location.

Block 810 includes the controller 118 defining Bezier curves between (i) the first point and the beginning point, and (ii) the first point and the ending point, the beginning and ending points corresponding to the two points nearest to the first point that were not selected for editing (e.g., as shown by curves 514-A, 514-B in FIG. 5B above). The Bezier curves are defined by the four control points of equation 1 above. Two of the four points ($P_1$ and $P_4$) include the first point, selected by the user, and either the beginning or ending point. The remaining two points ($P_2$ and $P_3$) are placed at a predetermined distance from the first two points in a direction corresponding to the $\theta$ state parameter of the points $P_1$ and $P_4$. In some embodiments, instead of using a predetermined distance for the control points $P_2$ and $P_3$, the controller 118 may determine a minimum-length Bezier curve which connects the beginning/ending points to the first point which would, in turn, define $P_2$ and $P_3$.

Block 812 includes the controller 118 moving the plurality of selected route points 506 onto the Bezier curves defined in block 810. The points 506 are moved onto the Bezier curves such that each point 506 is equally distant from its nearest neighboring points. Distance may refer to geometric distance, distance along the route or Bezier curve, or temporal distance (i.e., time required to move from one point 506 to the next). If the Bezier curve adds additional length to the route, the controller 118 may add additional route points within the edited segment, or vice versa for shortening segments.

Block 814 includes the controller 118 providing Bezier controls to the first point (i.e., selected point in block 804). Each Bezier curve comprises controls comprising the pairs of control points $P_1$ and $P_2$ or $P_3$ and $P_4$. Two Bezier curves are defined in block 812 and both share one control point, the first point. For non-holonomic robots 102, only the first point is provided with Bezier controls in order to preserve the heading angles $\theta$ of the non-selected segments of the route. For holonomic robots 102, additional Bezier controls may be provided at the ends of the Bezier curves defined in block 812 in addition to the first point selected in block 804. These Bezier controls may then be used by the user to manipulate the shape of the Bezier curves such that the route is shaped in a desirable manner. Method 1000 below describes a process for the controller 118 to receive and process these edits.

Figure 9:
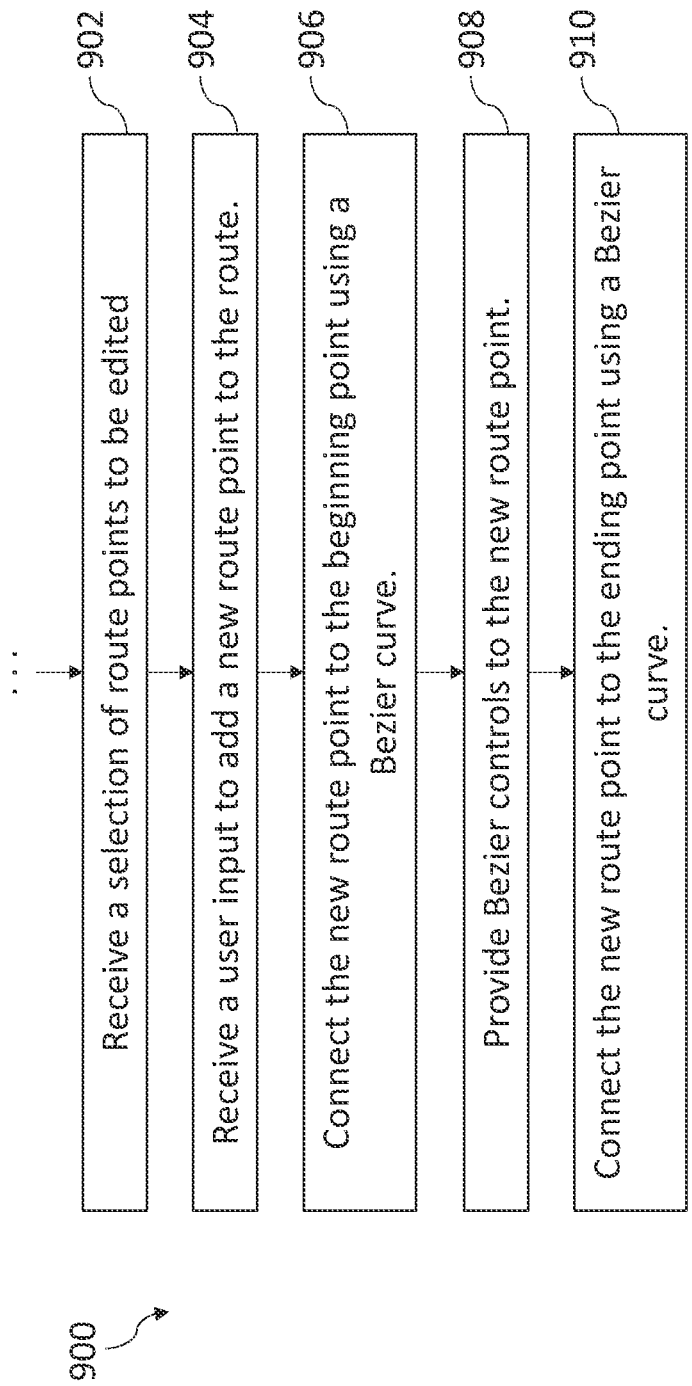
FIG. 9 is a process flow diagram illustrating a method for a controller of a robot to modify a segment of a route using Bezier controls, according to an exemplary embodiment.

FIG. 9 is a process flow diagram illustrating a method 900 for a controller 118 of a robot 102 to add new route segments or points to an existing route, according to an exemplary embodiment. Steps of method 900 may be effectuated via the controller 118 executing computer readable instructions from memory 120. Similar to methods 700 and 800, method 900 may also be executed on a device 208 external to the robot 102, wherein edits to the routes may be communicated to the robot 102 once the edits are complete.

Method 900 begins after method 700 or 800 has been completed, wherein a segment of the route is deleted or edited. For method 700, the selection of route points to be edited in block 902 corresponds to the new route points added after deleting another segment of route. Bezier controls are only provided in some embodiments to the end points of the new segment for holonomic robots 102, and are preferably not provided for non-holonomic robots 102. For method 800, the selection in block 902 corresponds to the selection of block 806. The selection of points in block 902 includes a range of route points 412 beginning at a beginning point and ending at an ending point.

Block 904 includes the controller 118 receiving a user input to add a new route point to the route. The user input may comprise the user interface units 112 receiving a click, tap, or other selection of a location on a computer readable map. The location selected by the user may define the location of a new point to be added to the route, as shown in FIG. 6B for example. By clicking or selecting a location on the map after deleting the segment of route in method 700, the controller 118 may recognize the selection as an indication that a new point should be added to the route and method 900 should be executed. In some embodiments, the user may be required to select an option on the user interface units 112, such as "add new route point" or similar options, in order for the controller 118 to place the new route point on the map. These additional steps may be useful to avoid adding unnecessary points to the map in the case of an accidental touch or click.

Block 906 includes the controller 118 connecting the new route point to the beginning point using a Bezier curve. The Bezier controls provided to the beginning point in block 902 may be maintained, thus providing control points $P_1$ and $P_2$. Control point $P_4$ corresponds to the location of the selected new point. Control point $P_3$ may be placed at either a predetermined distance from point $P_4$ or proportional to the distance between the beginning point and the new location. The axis 304 formed between points $P_3$ and $P_4$ may be oriented based on the direction of the selected new location with respect to the beginning point, as shown in FIG. 6B for example by vector 612. That is, the vector between the beginning point and new location corresponds to the orientation of the axis 304 for the Bezier controls of the new point at the new location. Block 908 includes the controller 118 providing Bezier controls to the new route point.

Block 910 includes the controller 118 connecting the new route point to the ending point using a Bezier curve. This Bezier curve is defined by four control points: two points, provided in blocks 906-908 above, about the new route point and the two control points provided in block 710 to the end point. Preferably, non-holonomic robots should only have user-manipulatable Bezier controls provided to the new route point.

Following block 910, the user may either select a new location for another new route point and return the controller 118 to block 902, wherein the previously added new route point serves as the beginning point for the next iteration of method 900. That is, every additional new route point (after the first new route point) connects to a prior added route point, wherein additional new route points are connected in sequential order. In some instances, the user may not desire any additional new route points and may provide input to the user interface units 112 (e.g., 'enter' key) to cause the controller 118 to complete the route using the Bezier curve calculated in block 910. In some instances, the user may edit the segment between the new route point and the beginning point of the deleted segment following method 800. That is, methods 700, 800, and 900 may be executed in any order as deemed necessary by the user to create their desired route for the robot 102 to execute.

Figure 10:
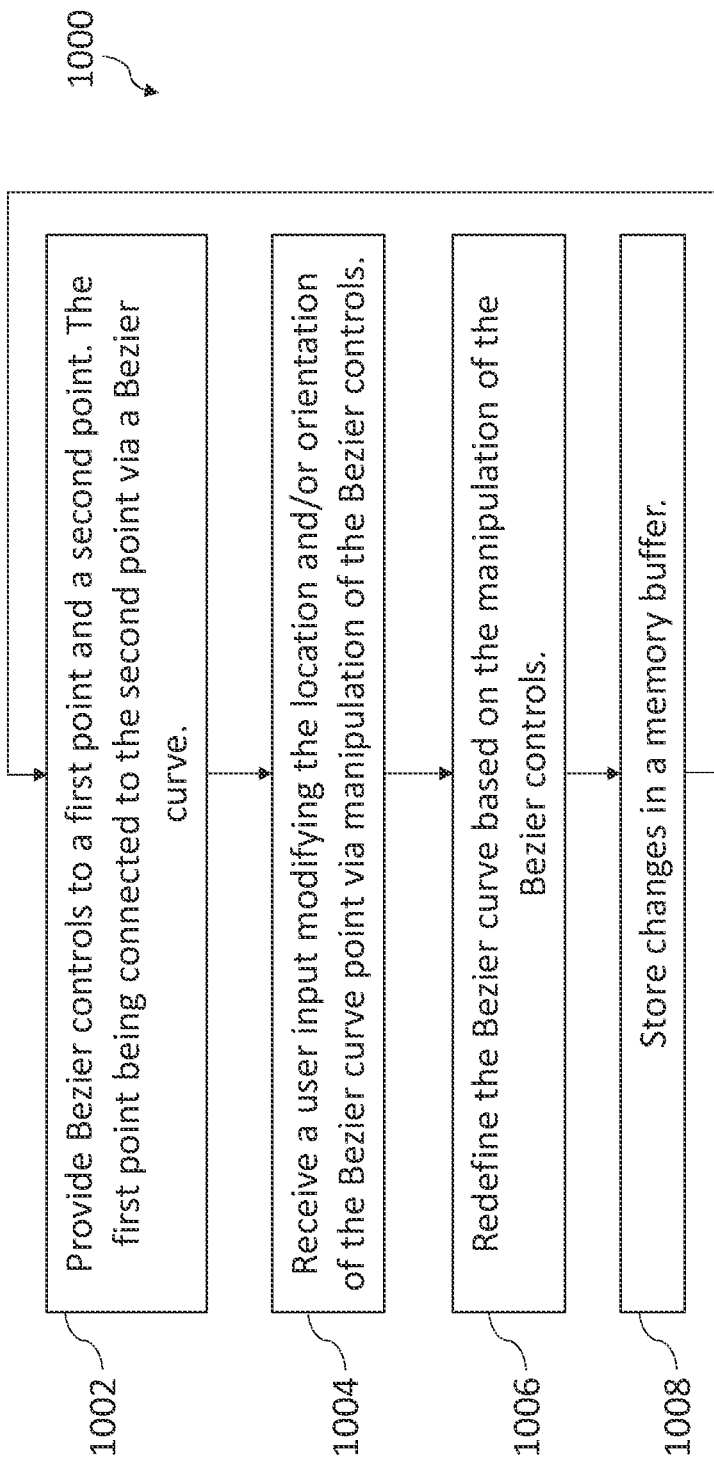
FIG. 10 is a process flow diagram illustrating a method for a controller of a robot to track edits to a route, according to an exemplary embodiment.

FIG. 10 is a process flow diagram illustrating a method 1000 for a controller 118 of a robot 102 to receive input from a user to manipulate a Bezier curve, according to an exemplary embodiment. The Bezier curve in method 1000 may be any of the Bezier curves described in FIG. 7-9 above.

Similar to methods 700, 800, and 900 above, method 1000 may also be executed on a processing device 138 external to the robot 102, wherein the edits may be communicated to the robot 102 once completed.

Block 1002 includes the controller 118 providing Bezier controls to a first point and a second point, wherein the first point is connected to a second point via a Bezier curve. Bezier controls, as used herein, comprise four control points $P_1$ through $P_4$ shown in FIG. 3 above. In some embodiments, mirrored control points 302 may be provided.

Block 1004 includes the controller 118 receiving a user input modifying the location and/or orientation of the Bezier curve via manipulation of Bezier controls. The user may click/tap and drag the control points to modify the shape of the curve, as shown in FIG. 5C(i-ii) above as an example. The input in block 1004 includes a single action, such as a single click and drag motion of one control point.

Block 1006 includes the controller 118 redefining the Bezier curve based on the modifications to the Bezier control points. The redefined Bezier curve may be determined based on equation 1 above.

Block 1008 includes the controller 118 storing the changes to the Bezier curve in memory 120 using a buffer. The buffer enables the user to, at any point, undo their previous action (e.g., using control+z or by clicking an undo button). This memory buffer may further be utilized to redo any undone action.

The same memory buffer may also store other actions, such as deletions of segments of a route or additions of new segments of the route following methods 800, 900 above, to enable the user to undo any action. Typically, undo actions may undo a single movement of a control point, addition of a new route point, or deletion of a segment of route. Similarly, any undone actions may be redone using the same buffer. Advantageously, by tracking each incremental change to the route using the memory buffer enables the controller 118 to allow the user to undo or redo any actions performed.

Once the shape of a route has been edited via manipulating the route or adding/deleting segments thereof, hardware states may be defined via the user interface 112 of the robot 102. As discussed above, hardware states refer to any actuatable hardware of the robot 102, typically used to perform robot specific tasks. Hardware states may include, for example, binary values which indicate a vacuum cleaner being on/off, a scrub deck being active/idle, a latch being engaged or disengaged to allow the robot 102 to carry items, etc. and/or analog values such as a speaker volume, vacuum cleaner strength, maximum speed limits, and so forth. By default, the hardware states of manipulated/edited segments may be maintained to their values before any edits. For example, in FIG. 5B above, the hardware states of selected points 506-S may be maintained after they have been moved. By default, the hardware states of a new segment of route may comprise the values equal to the start or end points of the deleted segment. For example, in FIG. 6B, the hardware state of the newly added point 608 may be the same as either the end or beginning points 604. In some instances, especially when creating new route segments, the user may desire to change the hardware states of the robot 102 (e.g., from cleaning an area to no longer cleaning an area). Accordingly, the user may select one or more route points 506-S (in a similar manner as described in FIG. 5A above for selecting points 506-S to be manipulated) and adjust the hardware states thereof using the user interface 112.

Figure 11:
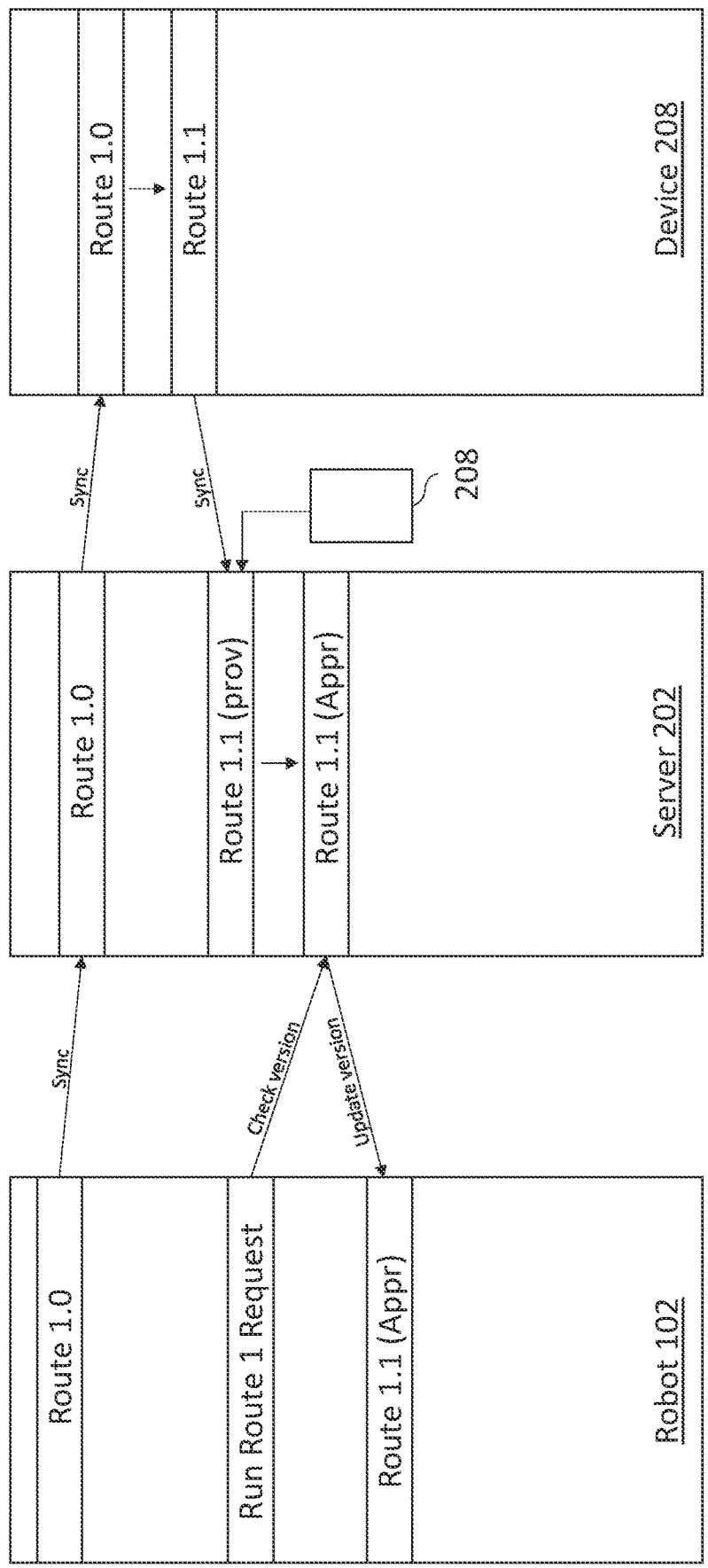
FIG. 11 is a system block diagram for a system configured to edit robotic routes remotely, according to an exemplary embodiment.

FIG. 11 illustrates a system for managing route data in accordance with edits performed external to a robot 102, according to an exemplary embodiment. First, starting with the robot 102, an operator may demonstrate, teach, install, or otherwise cause the robot 102 to generate a new route. The route is, for now, version 1.0. Once the route 1.0 is created, the controller 118 may synchronize ("sync") with a server 202 to store the route 1.0 data onto the server. This synchronization may not only prevent loss of route 1.0 data in the case of, e.g., a hardware failure of the robot 102, but also allows devices 208 which interface with the server 202 to access the route data, as shown by a device 208 synchronizing with the server 202 to download route 1.0.

For any reason, or lack thereof, the operator of the device 208 may perform an edit of any magnitude to the route 1.0 to produce a new version of the route 1.1. This new version 1.1 of the route may then be synchronized back to the server 202 and marked as 'provisional'. The server 202 now has the original route 1.0 data and newly edited route 1.1 data stored thereon. Preferably a second device 208 managed by another operator separate from the one performing the edits may approve of the provisional route 1.1 (prov) to generate an approved route 1.1 (appr). Approving a new version of the route on the server 202 will cause the server 202 to provide the approved route 1.1 (appr) to the robot 102 upon the robot 102, e.g., turning back on, finishing its current task, or otherwise connecting with the server 202. For instance, as illustrated, the robot 102 receives a request to run route 1 from an operator. The robot 102 may verify that its current version of the route 1 is up to date via checking with the server 202, provided a connection (e.g., Wi-Fi) exists. Upon determining there is a new route version available and approved for use, the robot 102 may download and execute the updated route 1.1 (appr).

It is preferred that the operator which approves of the new route edits be separate from the one performing the edits, however it is not a requirement. For instance, an operator editing a route from a remote location may lack understanding of the environment, such as the usual traffic flow of people therein, whereas an operator at the location of the robot 102 may have additional context of the environment to determine if a proposed edit to a route will, in practice, be useful. In some instances though, the operator performing the edits to the route may be the same operator approving the edits provided the operator is both skilled in editing routes and knowledgeable about the impact thereof. Typically, remote route edits may be performed after noticing a substantial amount of navigation errors, faults, or other situations which cause the robot 102 to become stuck (i.e., unable to navigate without collision) and can be performed to alleviate such errors, however such remote editing may not consider particulars of the environment. For example, a remote edit may be performed to cause a floor scrubbing robot 102 to avoid a high-congestion area, however the remote editor may not be aware of a carpet floor which the robot 102 would have to navigate over to avoid the high-congestion area, thus a separate operator approving the edits is preferred.

Advantageously, the synchronization of routes and versions between the robot 102, server 202, and devices 208 allow for remote editing of the routes. Further, storing the versions of the route separate from the robot 102 is advantageous by reducing memory usage on the robot 102 by instead leveraging external storage which can be increased in volume without impacting robot 102 performance. Additionally, storing of the prior route versions may enable an operator to revert back to a prior version of a route if, e.g., an edit causes a degradation in performance. It is appreciated by one skilled in the art that any edits or processes performed by the controller 118 to effectuate editing as described herein may also be performed via a processor on a device 208 separate from the robot 102.

According to at least one non-limiting exemplary embodiment, a plurality of separate tools may be provided on a user interface (e.g., of a robot 102 or device 208) to enable the edits described herein. First, at least two selection tools are provided: center selection and edge selection. Center selection enables a user to select a point which represents the center point of any edits performed (e.g., FIG. 5A-B). The range about the center can be defined via an integer number of route points or a distance along the path input by the user. For instance, the user may select a range of 3 meters, wherein upon using the center selection tool to select a point, all points 3 meters from the selected point will be selected for editing.

Edge selection tools enables the user to select a range of route points by selecting a beginning and ending point of the range. The user may drag the beginning or ending points along the route to lengthen or shorten their selection, wherein the dragged point is maintained along the route while being dragged. Edge selection may be a valuable tool for selecting path portions which are overlapped by other path portions not desired to be selected.

In addition to the selection tools, at least three editing tools are provided: adjustment tools, repath tools, and path select tools. The adjustment tools are described in FIG. 5B-C and FIG. 8 above. In short, the adjustment tool enables the user to select a point and move the point to a different location on a map. The moved point is then connected back to the route via Bezier curves.

The repath tool enables adding or deleting segments of a route. The user may, using any of the aforementioned selection tools, select a segment of the route to be edited. Upon selecting the repath tool, the segment of route is deleted and the beginning point of the selection is connected to the ending point of the selection via a Bezier curve, as shown in FIG. 6B and described in FIG. 7. Typically, this solution is not the ideal solution, wherein the user may then utilize the adjustment tools to modify the new segment to their liking.

Lastly, the path select tools enable constraints to editing by constraining any manipulation of the path to being between two points defined by the path select tool. The path select tool enables precise editing of a particular portion of the route and guarantees only that selected portion is modified. The path select tools are particularly useful for selecting and editing path segments which overlap with many other path segments.

It will be recognized that, while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being redefined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein, "defined" or "determined" may include "predefined" or "predetermined" and/or otherwise determined values, conditions, thresholds, measurements, and the like.

What is claimed is:

1. A robot, comprising:
a user interface coupled to the robot;
a memory comprising computer readable instructions stored thereon;
and a controller configured to execute the computer readable instructions to:
receive, via the user interface, a user input corresponding to one or more modifications to a route traveled by the robot, the route being displayed on a computer readable map of an environment, the route comprising a start point and an end point which is proximate to a landmark;
update the route in accordance with the one or more modifications using at least one Bezier curve; and
execute the updated route including the one or more modifications, wherein the controller prevents modifications to the location of the start point and the end point on the computer readable map.

2. The robot of claim 1, wherein,
the one or more modifications comprise at least one of deleting a segment of the route or changing the segment of the route to a new location on the user interface.

3. The robot of claim 2, wherein,
the deleting the segment of the route is based on selection of the segment of route received via the user interface, the selection of the segment includes a selection of a beginning point and a final point; and
the controller is further configured to execute the computer readable instructions to:
remove the selected segment of the route, and
connect the beginning point and the final point using the at least one Bezier curve.

4. The robot of claim 3, wherein,
the at least one Bezier curve is a cubic Bezier curve defined by four points, two of the four points corresponding to the beginning and final points, the remaining two of the four points are determined based on (i) spatial separation between the beginning and ending points, and (ii) direction of the robot at the beginning and final points.

5. The robot of claim 2, wherein the changing the segment of the route comprises a length defined via a user input from a first point along the route selected by the user input, and the segment is defined by a beginning point and an end point.

6. The robot of claim 5, wherein the controller is further configured to execute the computer readable instructions to,
receive, via the user interface, user input to change a location of the first point from one location to a different location;
define the at least one Bezier curve between (i) the first point and the beginning point, and (ii) the first point and the end point, the Bezier curve is defined based in part on the direction of the robot at the beginning, end, and first points.

7. The robot of claim 6, wherein the controller is further configured to execute the computer readable instructions to,
provide Bezier controls to the first point; and
update the route in accordance with user input to the Bezier controls, the user input comprising moving the Bezier controls.

8. The robot of claim 1, wherein the controller is further configured to execute the computer readable instructions to,
receive, via the user interface, an undo instruction for undoing a prior edit or deletion of the route; and
receive, via the user interface, a redo instruction for redoing an edit removed via the undo operation.

9. A non-transitory computer readable storage medium comprising a plurality of computer readable instructions stored thereon which, when executed by a controller of a robot, cause the controller to:
receive, via the user interface, a user input corresponding to one or more modifications to a route traveled by the robot, the route being displayed on a computer readable map of the environment, the route comprising a start point and an end point which is proximate to a landmark;
update the route in accordance with the one or more modifications using at least one Bezier curve; and
execute the updated route including the one or more modifications, wherein the controller prevents modifications to the location of the start point and the end point on the computer readable map.

10. The non-transitory computer readable storage medium of claim 9, wherein,
the one or more modifications include at least one of deleting a segment of the route or changing the segment of the route to a new location on the user interface.

11. The non-transitory computer readable storage medium of claim 10, wherein,
the deleting the segment of the route is based on selection of the segment of route received via the user interface, the selection of the segment includes a beginning point and a final point; and
the controller is further configured to execute the computer readable instructions to:
remove the selected segment of the route, and
connect the beginning point and the final point using the at least one Bezier curve.

12. The non-transitory computer readable storage medium of claim 11, wherein,
the at least one Bezier curve is a cubic Bezier curve defined by four points, two of the four points corresponding to the beginning and final points, the remaining two of the four points are determined based on (i) spatial separation between the beginning and final points, and (ii) direction of the robot at the beginning and final points.

13. The non-transitory computer readable storage medium of claim 10, wherein, the changing the segment of the route comprises a length defined via a user input from a first point along the route selected by the user input, and the segment is defined by a beginning point and an end point.

14. The non-transitory computer readable storage medium of claim 13, wherein the controller is further configured to execute the computer readable instructions to,
receive, via the user interface, user input to change a location of the first point from one location to a different location;
define the at least one Bezier curve between (i) the first point and the beginning point, and (ii) the first point and the end point, the Bezier curve is defined based in part on the direction of the robot at the beginning, end, and first points.

15. The non-transitory computer readable storage medium of claim 14, wherein the controller is further configured to execute the computer readable instructions to,
provide Bezier controls to the first point; and update the route in accordance with user input to the Bezier controls, the user input comprising moving the Bezier controls.

16. The non-transitory computer readable storage medium of claim 9, wherein the controller is further configured to execute the computer readable instructions to,
receive, via the user interface, an undo instruction for undoing a prior edit or deletion of the route; and
receive, via the user interface, a redo instruction for redoing an edit removed via the undo operation.

17. A method for editing routes for a robot, comprising:
receiving, via a user interface, a user input corresponding to one or more modifications to a route traveled by the robot, the route being displayed on a computer readable map of the environment, the route comprising a start point and an end point which is proximate to a landmark;
updating the route in accordance with the one or more modifications using at least one Bezier curve; and
executing the updated route including the one or more modifications,
wherein the one or more modifications are prevented for the location of the start point and the end point on the computer readable map.

* * * * *